United States Patent [19]

Kipp

[11] 4,429,309
[45] Jan. 31, 1984

[54] TRACKING FILTER SYSTEM FOR USE WITH A FM/CW RADAR

[75] Inventor: Ronald W. Kipp, Croydon, Pa.

[73] Assignee: RCA Corporation, New York, N.Y.

[21] Appl. No.: 258,434

[22] Filed: Apr. 28, 1981

[51] Int. Cl.³ ............................................. G01S 13/32
[52] U.S. Cl. ................................ 343/7 PL; 328/167; 343/14
[58] Field of Search ................ 328/167; 343/7 PL, 14

[56] References Cited

U.S. PATENT DOCUMENTS

| | | | |
|---|---|---|---|
| 3,683,279 | 8/1972 | Weinberg et al. | 343/7 PL X |
| 3,787,774 | 1/1974 | Tietze et al. | 328/167 |
| 4,027,264 | 5/1977 | Gutleber | 328/167 |
| 4,136,314 | 1/1979 | Blackmer et al. | 328/167 |
| 4,210,023 | 7/1980 | Sakamoto et al. | 343/14 X |
| 4,234,882 | 11/1980 | Thompson | 343/14 |
| 4,321,602 | 3/1982 | Kipp | 343/7 PL X |

Primary Examiner—T. H. Tubbesing
Attorney, Agent, or Firm—J. S. Tripoli; R. L. Troike; R. E. Smiley

[57] ABSTRACT

A tracking filter system including a phase locked loop and a tracking filter is receptive of an input signal of frequency A and undesired frequency X from a signal source such as a frequency modulated/continuous wave radar range measuring system. The phase locked loop circuit receives the input signal and produces a control signal corresponding to a frequency intermediate frequencies A and X. The tracking filter is set by the control signal to pass frequencies above or below the intermediate frequency and thus to pass frequency A and to reject frequency X.

6 Claims, 3 Drawing Figures

TRACKING FILTER SYSTEM FOR USE WITH A FM/CW RADAR

This invention relates to tracking filter systems and more particulary, to such systems for use with range measuring frequency modulated/continuous wave (FM/CW) radar sytems for determining a specific range from concurrent signals indicative of different ranges.

FM/CW radar ranging systems are well known. U.S. Pat. No. 4,245,221 issued to the inventor of the instant application and H. C. Johnson, and assigned to the assignee of the instant invention, is an example of such a radar system. Such systems employ a transmitting and receiving antenna which has a finite beam width. If the target, the range of which is to be measured, is not of uniform range from the antenna within the beam width, the FM/CW system produces a beat frequency signal which is comprised of multiple frequencies corresponding to multiple distances of the target from the antenna. Such multiple frequencies also can result from multipath signals and from electrical noise and generally cause the FM/CW system to give an incorrect range reading.

One solution to the problem is to produce a Fast Fourier Transform of the beat frequency signal. Then the lowest frequency corresponding to the shortest measured range is recognized and processed by a computer or dedicated data processor. Such a system is rather complex for use with many types of FM/CW radar systems.

In accordance with a preferred embodiment of the invention, a signal processing system for use in an FM/CW radar range measuring system includes a means receptive of an input alternating signal containing both a desired frequency A and an undesired frequency X for producing a control signal indicative of an intermediate frequency. A tracking low pass or high pass filter is receptive of the input signal and has a control terminal receptive of the control signal for becoming set to pass frequency A and reject frequency X.

Figure 1:
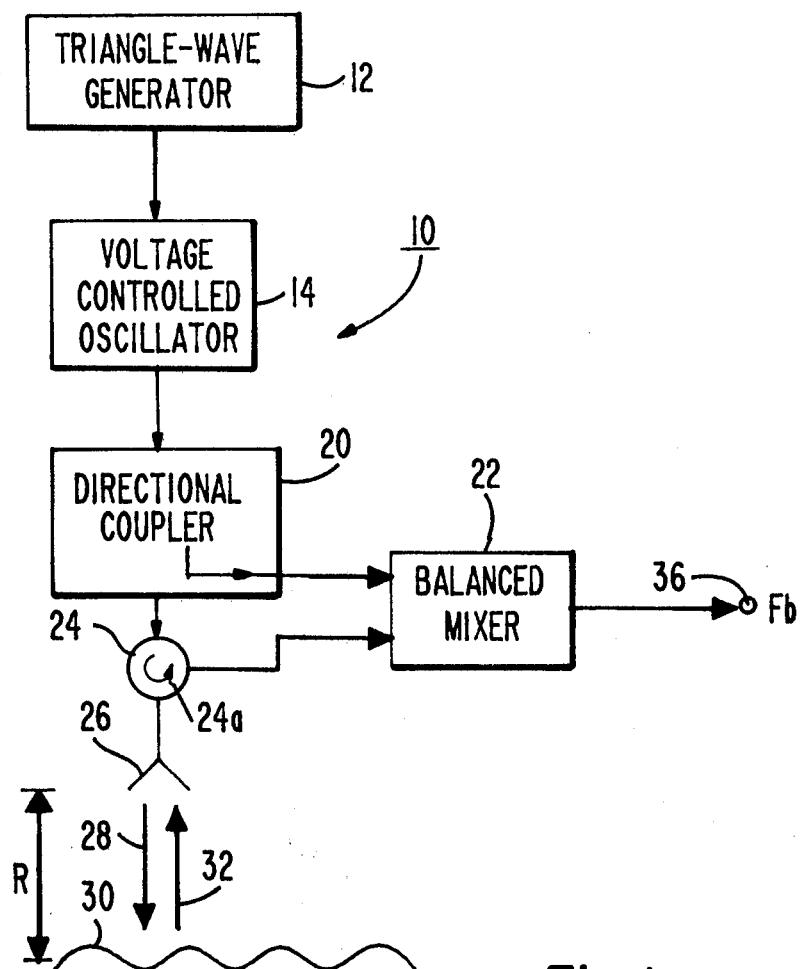
FIG. 1 is a block schematic representation of a basic FM/CW radar system.
Figure 2:
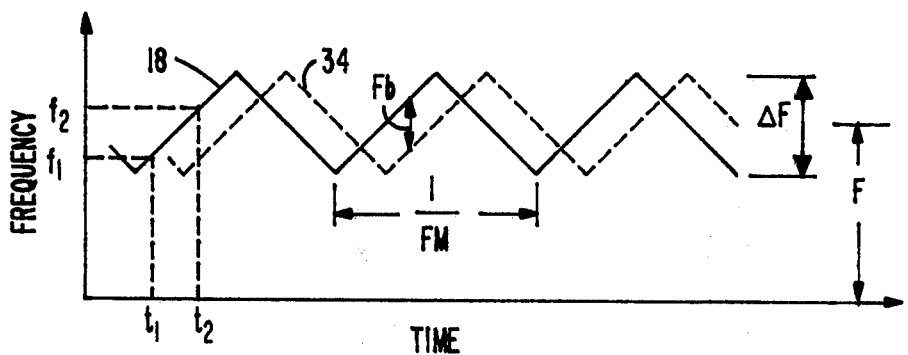
FIG. 2 is a set of waveforms useful in understanding the operation of the radar system of FIG. 1.

Referring now to FIG. 1, an FM/CW ranging radar system 10 of basic design comprises a triangle-wave generator 12 modulating a voltage controlled oscillator (VCO) 14 to produce the signal waveform indicated in the solid line 18 in FIG. 2, i.e. a signal centered at frequency F having a total frequency excursion of $\Delta F$ and modulated at a rate FM. The signal produced by VCO 14 is passed by a directional coupler 20 to one input of a balanced mixer 22 and to one port of a three port circulator 24. A second port of circulator 24 is connected to an antenna 26, typically a transmitting and receiving antenna, for radiating the signal indicated at 18, FIG. 2, toward a suitable target 30, the range R of which is to be measured. Arrow 28 indicates a signal being radiated to target 30 and arrow 32 indicates the return signal being reflected back from target 30 toward antenna 26. The reflected signal received at antenna 26, as illustrated in the dashed line 34, FIG. 2, is passed by circulator 24 in the direction of arrow 24a to a second input of balanced mixer 22.

Balanced mixer 22 in response to input signals applied thereto produces a beat frequency signal Fb which is equal to the magnitude of the difference of the frequencies applied thereto. All components of FIG. 1 and their interconnection are of conventional design.

Referring to FIG. 2, if at a point in time $t_1$ a given frequency $f_1$ is transmitted by antenna 26 toward target 30 and if at a later time $t_2$ the signal at frequency $f_1$ is returned to antenna 26 to be thus applied to mixer 22 when frequency $f_2$ is also applied to mixer 22 via directional coupler 20, then $Fb = |f_2 - f_1|$ from which range R can be determined as follows:

$$Fb = \frac{4 \times R \times \Delta F \times FM}{C} \quad (1)$$

where C is the speed of light and other terms are as illustrated in FIG. 2. In a realistic situation in which the transmitted beam width from antenna 26 is finite and where the range R as illustrated in FIG. 1 is not of a given distance but rather varies, such as due to the type of target 30 illustrated in FIG. 1, then the beat frequency signal Fb is not of a given frequency but rather is a mixture of frequencies. Further, the signal transmitted from antenna 26 may strike two or more targets at different ranges from antenna 26 or the return signal 32 may strike intermediate objects between target 30 and antenna 26 to thus create what is known as a multipath signal. All of these situations case Fb to be other than a single frequency signal. In one exemplary installation of a system 10 for measuring material height in a steel mill blast furnace, such phenomena as above-described has been found to occur. By experimentation it has been found desirable to process only that beat frequency which is the lowest frequency of the range of beat frequencies produced at mixer 22 and thus corresponding to the shortest range R.

Figure 3:
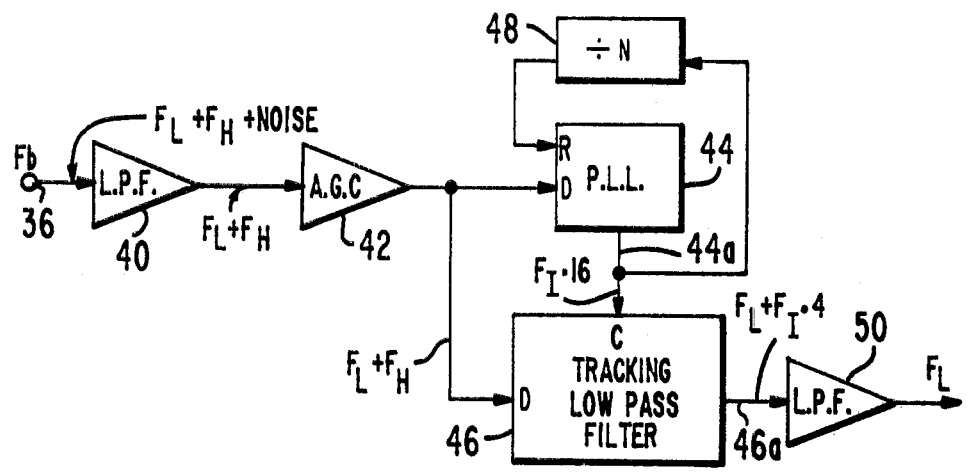
FIG. 3 is a logic and block schematic diagram of a signal processing system for use with the radar system of FIG. 1 in accordance with a preferred embodiment of the invention.

Referring now to FIG. 3, terminal 36, which also appears in FIG. 1, is connected to the input of a low pass filter 40. The beat frequency signal appearing at terminal 36 typically comprises a relatively low frequency component $F_L$, a relatively high frequency component $F_H$ and very high frequency noise. Low pass filter 40 filters out the very high frequency noise. Low pass filter 40 is coupled to an automatic gain control circuit (AGC) 42 which produces at its output a signal of uniform amplitude. AGC 42 is coupled to the data (D) terminals of a phase locked loop circuit (PLL) 44 and a tracking low pass filter (TLPF) 46. PLL 44 is coupled to the control (C) terminal of TLPF 46 and to the input of a suitable divide-by-N circuit 48, the output of which is coupled to the reference (R) terminal of PLL 44. The output of TLPF 46 is coupled to a low pass filter 50 which passes frequency $F_L$ as will be described hereinafter, but filters out undesirable harmonic frequencies produced by TLPF 46.

Each of the circuits illustrated in FIG. 3 is of conventional design. In particular, PLL 44 may be a CD4046 CMOS integrated circuit chip sold by RCA Corporation, Somerville, N.J. TLPF 46 may be of the type manufactured by E. G. & G. Reticon, 345 Patrero Avenue, Sunnyvale, Calif. 94086 under catalog #R5602-2.

Operation of the circuits of FIGS. 1 and 3 is as follows. When it is desired to measure a range to a target 30, VCO 14 modulated by a signal from triangle wave generator 12 produces a signal (waveform 18, FIG. 2) which is coupled to balanced mixer 22 and to antenna 26 to be transmitted thereby to target 30. The transmitted signal may be by way of example 10.525 GHz. Return signals from target 30 are also applied to balanced mixer 22 which thereby produces a beat frequency signal at terminal 36. In a theoretical but not typically a practical case, where Fb is of a single frequency, formula (1) can be utilized to determine range R. Typically, however, the frequency produced at terminal 36 contains a desirable relatively low frequency signal $F_L$, an undesired relatively high frequency signal $F_H$ and an undesired very high frequency noise signal component. This combination signal is applied to low pass filter 40, FIG. 3, which filters out the noise, thus leaving a signal having frequency components $F_L$ and $F_H$. This combination signal is applied to AGC 42 which produces an output signal of uniform amplitude and having the same frequency components $F_L$ and $F_H$. That signal is applied to the data terminal of TLPF 46 and to the data terminal of PLL 44. PLL 44 when receiving a signal comprised of various frequency components such as $F_L$ and $F_H$ will, by its nature, produce an output signal $F_I$ on output line 44a which is intermediate the various frequency components that are received at the data terminal thereof. The actual output frequency is determined by the relative amplitude vectors of the various components of input frequency, thus, assuming for a moment that circuit 48 is a divide-by-1 circuit and assuming that a 10 kHz signal $F_L$ and 20 kHz signal $F_H$ of equal amplitude are applied to the data terminal of PLL 44 an output signal of 15 kHz will result. As will be described shortly below, TLPF 46 operates best with an input control (C) signal which is a multiple of its cutoff frequency.

In accordance with the desired operation of TLPF 46, it is desired that PLL 44 produce a signal which is not $F_I$ but rather 16 times $F_I$. Thus, by having N=16 in circuit 48 and interconnected with PLL 44, as is known to those skilled in the art, PLL 44 will produce the desired 16 times $F_I$ on line 44a. With the signal $F_I \times 16$ applied at terminal C of TLPF 46, the 3-db cutoff frequency of TLPF 46 occurs at $F_I$. That is, TLPF 46 passes all frequencies below $F_I$ and rejects all frequencies above $F_I$. Therefore, in the situation in which a signal of two frequencies $F_L$ and $F_H$ is applied to TLPF 46, only signal $F_L$ appears at its output on line 46a. In the limit situation in which only frequency $F_L$ occurs, TLPF 46 will be set to $F_L$ and therefore TLPF 46 will pass $F_L$.

It happens that with the particular type of TLPF 46 chosen, undesirably a harmonic signal $F_I \times 4$ is also produced. This undesired harmonic signal is easily rejected by LPF 50. Therefore, the desired signal $F_L$ appears at the output of LPF 50 and may be processed by circuitry to compute the desired range using equation (1).

It will be understood, of course, that in a particular application should it be desired that $F_H$ is the desired frequency, then a tracking high pass filter can be substituted for filter 46. Operation is otherwise as described above except that $F_H$ and $F_I \times 4$ would be produced on line 46a. Again, a low pass filter set above any desired frequency $F_H$ could be utilized to remove undesired harmonic frequency $F_I \times 4$.

What is claimed is:

1. A signal processing system comprising in combination:
    means receptive of an alternating signal having a desired frequency A and a different undesired frequency X for producing a control signal corresponding to a frequency intermediate frequencies A and X; and
    a tracking filter receptive of said alternating signal and having a control terminal receptive of said control signal for causing said filter to pass frequency A and reject frequency X.

2. A range measuring system comprising in combination:
    means producing a continuous wave radio frequency (RF) signal which is modulated in accordance with a pre-selected parameter;
    means for transmitting said RF signal toward a target, the range of which is to be measured, and for receiving a return reflected signal therefrom;
    means for subtractively mixing said transmitted signal and return signal to produce a beat frequency signal which contains a frequency A corresponding to said range and a different undesired frequency X;
    means responsive to said frequencies A and X for producing a control signal corresponding to a frequency intermediate A and X; and
    a tracking filter responsive to said control signal and to said beat frequency signals for passing only frequencies above or below said intermediate frequency and responsive to said beat frequency signal for passing frequency A and rejecting frequency X.

3. The combination as set forth in claim 2 wherein said means producing said continuous wave RF signal includes means for modulating said continuous wave signal as a function of frequency with a triangular waveform.

4. The combination as set forth in claim 1 or 2 or 3 wherein A<X and wherein said tracking filter is a low pass tracking filter.

5. The combination as set forth in claim 1 or 2 or 3 wherein said means responsive to said frequencies A and X comprises a phase locked loop circuit.

6. The combination as set forth in claim 5 further including means cooperating with said phase locked loop for causing said phase locked loop to produce said control signal of a value which is a multiple of said intermediate frequency.

* * * * *